United States Patent
Kastner

[11] Patent Number: 5,819,375
[45] Date of Patent: Oct. 13, 1998

[54] TENSIONING STRAP

[75] Inventor: Michael Kastner, Wolfsburg, Germany

[73] Assignee: Volkswagen AG, Wolfsburg, Germany

[21] Appl. No.: 993,980

[22] Filed: Dec. 18, 1997

[30] Foreign Application Priority Data

Dec. 18, 1996 [DE] Germany .................. 196 52 726.0

[51] Int. Cl.⁶ .............................. B65D 63/00; F16B 2/08
[52] U.S. Cl. .................. 24/16 PB; 24/17 AP; 24/30.5 P
[58] Field of Search .................. 24/16 R, 16 PB, 24/17 A, 17 AP, 30.5 P, 30.5 R; 248/74.3

[56] References Cited

U.S. PATENT DOCUMENTS

| | | | |
|---|---|---|---|
| 4,507,828 | 4/1985 | Furutsu | 24/16 PB |
| 4,573,242 | 3/1986 | Lankton et al. | 24/16 PB |
| 4,776,067 | 10/1988 | Sorensen | 24/16 B |
| 4,788,752 | 12/1988 | Kraus et al. | 24/16 PB |
| 5,193,250 | 3/1993 | Caveney | 24/17 AP X |
| 5,685,048 | 11/1997 | Benoit | 24/16 PB |

Primary Examiner—Randolph A. Reese
Assistant Examiner—Robert J. Sandy
Attorney, Agent, or Firm—Baker & Botts, L.L.P.

[57] ABSTRACT

A tensioning strap for securing one or more elongate cables, pipes, hoses or similar objects has an elongate, flexible strap part which is provided with arresting elements and a tensioning lock which is affixed at one end of the strap part and is arranged to hold the strap part which is formed as a noose around and engages the objects. In order to form bundles of objects which are sensitive to pinching and have different overall bundle cross-sections without any risk of pinching or reductions in cross-section of the objects, a blocking element is provided in the region of the tensioning lock which comes into blocking engagement with the strap part and prevents further closing of the noose which is formed by the strap part when the strap part surrounds the objects in a closely abutting manner. The blocking engagement between the blocking element and the strap part is brought about by the blocking element and the strap part moving toward one another as a result of a force exerted by the objects on the strap part or the blocking element.

30 Claims, 6 Drawing Sheets

TENSIONING STRAP

BACKGROUND OF THE INVENTION

This invention relates to tensioning straps having an elongate, flexible strap part which is provided with arresting elements and used for forming into bundles and/or for securing one or more elongate cables, pipes, hoses or similar objects. At one end of the strap part a tensioning lock retains another portion of the strap part which has been wound around and holds the object or objects to be secured by engagement of a catch of the tensioning lock with at least one of the arresting elements of the strap part. The tensioning lock prevents enlargement of a noose-like loop formed by the strap part surrounding the object to be retained.

Tensioning straps of this type which are also referred to as cable ties, are generally used for holding together and, if appropriate, suspending on a mount, sections of cable forms or pipe or hose lines including a plurality of individual cables, pipes, hoses or the like extending adjacent to each other. For this purpose the strap part, which has spaced webs, ribs, teeth or other arresting elements arranged in spaced relation along part of its length, is wound around the cables, pipes or hoses which are to be formed into a bundle and its free end, which is opposite from the tensioning lock, is inserted through an opening in the tensioning lock, in which an elastically compliant catch is located. The catch is arranged so that, if no external force is exerted, it projects into an engagement position behind one or more of the arresting elements in the strap part in the tensioning lock and is reversibly deflected by each of the arresting elements as the strap part is pulled through the opening. As a result of its resilient restoring force, the catch moves back into the engagement position after each deflection, so that it blocks any rearward movement of the strap part opposite to the pulling direction. The strap part is usually pulled through the opening until it surrounds the cables, pipes or hoses around which it is wound in a tightly abutting manner and cannot be moved any further and is retained by the catch in that position.

However, in the case of pipes which are sensitive to pinching, in particular thinwalled pipes or longitudinally slit corrugated pipes, which are used, for example, in automotive engineering, inter alia, as heat and moisture protection for cables in the engine compartment, or in the case of hoses with an elastically compliant, deformable hose wall, such tight latching of the strap may lead to an undesirable squeezing of the pipes or hoses together, which could damage or destroy them or cause them to be undesirably reduced in cross-section. In principle, it is possible to avoid this problem by tightening the tensioning straps to a lesser extent. However, in the engine compartment of a motor vehicle the tensioning straps often have to be fitted "blind" and, on account of the risk of the cables, pipes or hoses chafing or rattling, the tensioning straps must not be too loose. In order to avoid these difficulties, tensioning straps which are of different lengths are usually used in automotive engineering and are adapted to the respective application and have a strip part which is provided with a stop to engage the tensioning lock and prevent further closing of the noose formed by the strap beyond a predetermined cross-sectional area. However, this requires a large number of tensioning straps of different lengths to be used, which, on the one hand, results in logistical problems and, on the other hand, can lead to mix-ups during the strap-applying operation itself.

SUMMARY OF THE INVENTION

Accordingly, it is an object of the present invention to provide a tensioning strap which overcomes the disadvantages of the prior art.

Another object of the invention is to provide a tensioning strap for holding cables, pipes, hoses and similar objects which are sensitive to pinching in bundles without risk of pinching or reduction of the cross-section of the objects, even for different overall bundle cross-sections.

These and other objects of the invention are attained according to the invention by providing a blocking element in the region of the tensioning lock which comes into blocking engagement with the strap part and prevents further narrowing of the noose formed by the strap part when the strap part surrounds the objects in a closely abutting manner. The blocking engagement between the blocking element and the strap part is brought about by moving of the strap part and the blocking element toward one another by a force exerted by the objects on the strap part or the blocking element. The invention is based on the finding that, as they are being tied together, the objects around which the tensioning strap is wound are displaced with respect to each other within the noose by a pulling force applied to the free end of the strap part until the objects have a collective cross-section which is as small as possible, or slightly larger than this, and engage the strap part all around the interior of the noose. If a pulling force continues to be applied to the free end of the strap part, a compressive force would be applied on the objects and it would be possible for this compressive force ultimately to cause the objects to be squeezed together. This compressive force is counteracted by an increasing reaction force which is utilized to prevent the squeezing-together action. For this purpose, a blocking element is provided on the tensioning lock, or in the vicinity thereof, which projects into the region between the objects and the strap part so that it is forced outwardly by the reaction force and is therefore brought into blocking engagement with the strap part or, alternatively, a blocking element is positioned outside the strap part and the strap part is forced outwardly by the reaction force with respect to the blocking element and is therefore brought into blocking engagement with the catch.

The tensioning strap according to the invention can be used irrespective of the overall cross-section of the objects around which it is wound with the result that, in addition to lower production costs, it is possible to achieve logistical advantages and greater process reliability by avoiding mix-ups, without increasing the cost of producing the tensioning strap to any great extent.

A preferred embodiment of the invention has a blocking element which comes into blocking engagement with at least one of the arresting elements of the strap part, preferably on the side of the arresting element, or of another arresting element, which is situated opposite the catch and which is behind the catch in the pulling direction. As result it is possible to block movement of the strap in the tensioning lock in both the pulling direction and in the opposite direction without any further design measures being taken on the strap part itself. The arresting elements which act on both sides of the strap part are preferably formed by longitudinally spaced webs which extend transversely with respect to the longitudinal direction of the strap part between two continuous longitudinal side members of the strap part. In principle, however, it is also possible to provide, instead of the arresting elements, additional latching elements on the strap part which come into blocking engagement with the blocking element in order to prevent further narrowing of the noose formed by the strap part. In this case, the latching elements and the arresting elements are preferably arranged on opposite sides of the strap part and comprise teeth having opposite flanks of different gradients so that the steeper flanks interact with the blocking element and the catch and secure the strap part in the engagement condition.

If the blocking element is positioned between the objects and the tensioning lock or the inside of the strap part, the blocking element is preferably connected pivotably to the tensioning lock, so that an engagement part of the blocking element which is spaced from the pivot point can be moved, by the force acting on the blocking element, into a space between adjacent arresting or latching elements. The blocking element and the tensioning lock may be separate pieces but preferably are formed as a single piece, it being possible for the pivot connection between the blocking element and the tensioning lock to comprise, for example, a bearing and bearing journal if they are separate pieces and to be in the form of a film hinge if they are parts of the same piece.

In order to prevent premature blocking engagement between the blocking element and the strap part, the engagement part is preferably arranged at the end of the blocking element which is situated opposite the pivot point so that the pivot path of the engagement part is larger than the pivot path of a blocking-element central part which comes into contact with the object. As a result, it is possible to maintain a comparatively large distance between the engagement part and the strap part before the objects engage the blocking element so that the engagement part does not obstruct the action of the strap part being pulled through the tensioning lock before engagement between the noose of the strap part and the objects occurs all the way around the noose.

Furthermore, it is also possible to provide for this purpose a retaining device between the tensioning lock and the blocking element which prevents the strap part and the blocking element from moving toward each other until the objects exert a predetermined reaction force on the blocking element or on the strap part which is sufficient to overcome the resistance of the retaining device against the blocking element.

If the blocking element is located on the outside of the noose formed by the strap part the blocking element is preferably connected rigidly to the tensioning lock and is expediently formed by a blocking nose which projects toward the strap part so that it is moved into the space between two adjacent arresting elements when the strap part is forced outwardly by the objects. The tensioning lock preferably has an opening to receive the other end of the strap part, and this opening is expediently provided, in its opposite sides, with guide surfaces which maintain a distance between the strap part and the blocking element and prevent premature blocking engagement of the blocking element if the strap part is pulled through the tensioning lock so that it butts against the guide surfaces.

Preferably, only a comparatively low reaction force is necessary in order to bring the strap part and blocking element into blocking engagement with each other, the magnitude of the reaction force preferably being selected, depending on the type of objects and the strength thereof, so that it is smaller than a force which would cause an undesired deformation, in particular an undesired squeezing together, of the objects.

DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
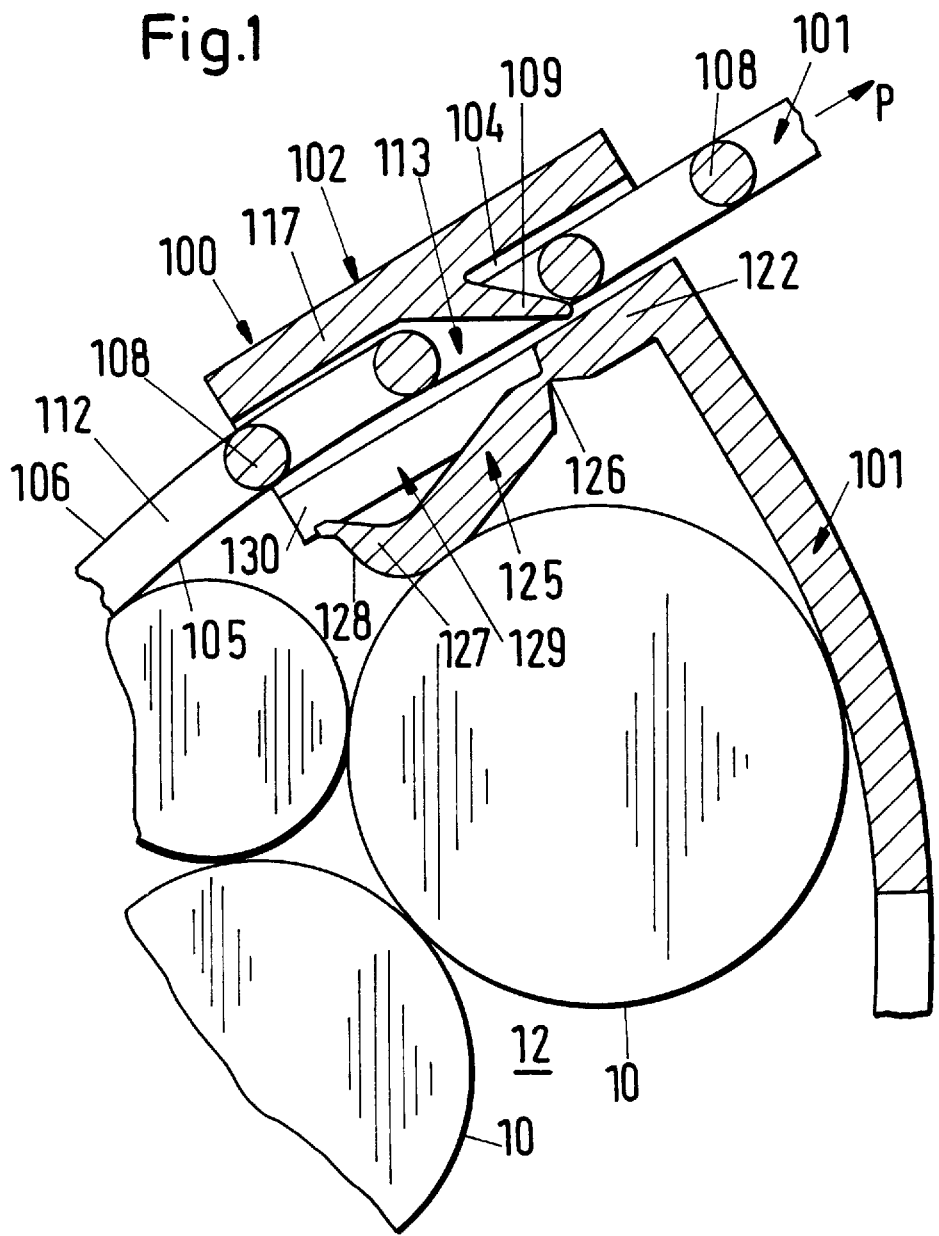
FIG. 1 is a fragmentary longitudinal sectional view, taken along the longitudinal axis of a representative embodiment of a tensioning strap according to the invention which has been wound around a bundle of corrugated pipes, showing the position of a blocking element before the tensioning strap tightly engages the bundle of pipes all the way around and before the blocking element prevents further narrowing of the noose formed by the strap part.

In the typical embodiments of the invention illustrated in FIGS. 1–5, the tensioning straps 100 (FIGS. 1 and 2), 200 (FIGS. 3 and 4), and 300 (FIG. 5) are each produced as a single piece by injection molding using a plastic material of a flexible type. These tensioning straps essentially comprise an elongate strap part 101, 201 or 301 and a tensioning lock 102, 202 or 302 which is integrally formed at one end of the strap part 101, 201 or 301 and has a rectangular cross-section opening 104, 204 or 304 which is surrounded by walls on all four sides and is arranged to receive the free end of the strap part 101, 201 or 301.

The strap part 101, 201 or 301 is essentially rectangular in cross-section having an inner broad side 105, 205 or 305 and an outer broad side 106, 206 or 306 and at its free end (not illustrated), i.e., the end which is not connected to the tensioning lock 102, 202 or 302, and it tapers to a rounded tip in order to facilitate the insertion of the free end of the strap part 101, 201 or 301 into the opening 104, 204 or 304 of the tensioning lock 102, 202 or 302.

The distance between the two side walls of the opening 104, 204 or 304 which are adjacent to the narrow sides of the strap part 101, 201 or 301 is slightly greater than the width of the strap part 101, 201 or 301 so that the strap can be pulled easily through the opening 104, 204 or 304, the narrow sides of the strap part being guided by the adjacent narrow walls of the through-passage opening 104, 204 or 304 and preventing lateral displacement of the strap part 101, 201 or 301.

At a selected region between its two ends, i.e. from a point just behind the tensioning lock 102, 202 or 302 to a point just in front of the tapering free end, the strap part 101, 201 or 301 has a plurality of arresting elements 108, 208 or 308 which are spaced in the longitudinal direction of the strap part and, if the strap part 101, 201 or 301 is being pulled in the direction P through the opening 104, 204 or 304 of the tensioning lock 102, 202 or 302, these elements interact with a flexibly compliant catch 109, 209 or 309, which projects into the opening 104, 204 or 304 in order to prevent the strap part 101, 201 or 301 from moving back through the tensioning lock 102, 202 or 302 in the direction opposite to the pulling direction during tightening of the tensioning strap 100, 200 or 300, and to prevent a noose 12, which is formed by the strap part 101, 201 or 301 and through which a plurality of longitudinally slit corrugated pipes 10 (only schematically illustrated) pass, from enlarging of its own accord.

In the typical embodiments of the invention illustrated in FIG. 1–4, the arresting elements are in the form of arresting webs 108 or 208 of circular cross-section which extend transversely between two mutually parallel longitudinal side portions 112 or 212 of the tensioning strap 100 or 200 and are longitudinally spaced in the manner of ladder rungs. The spaced webs 108 or 208, together with the longitudinal side portions 112 or 212 define blocking openings 113 or 213 for the blocking engagement of the catch 109 or 209.

Figure 5:
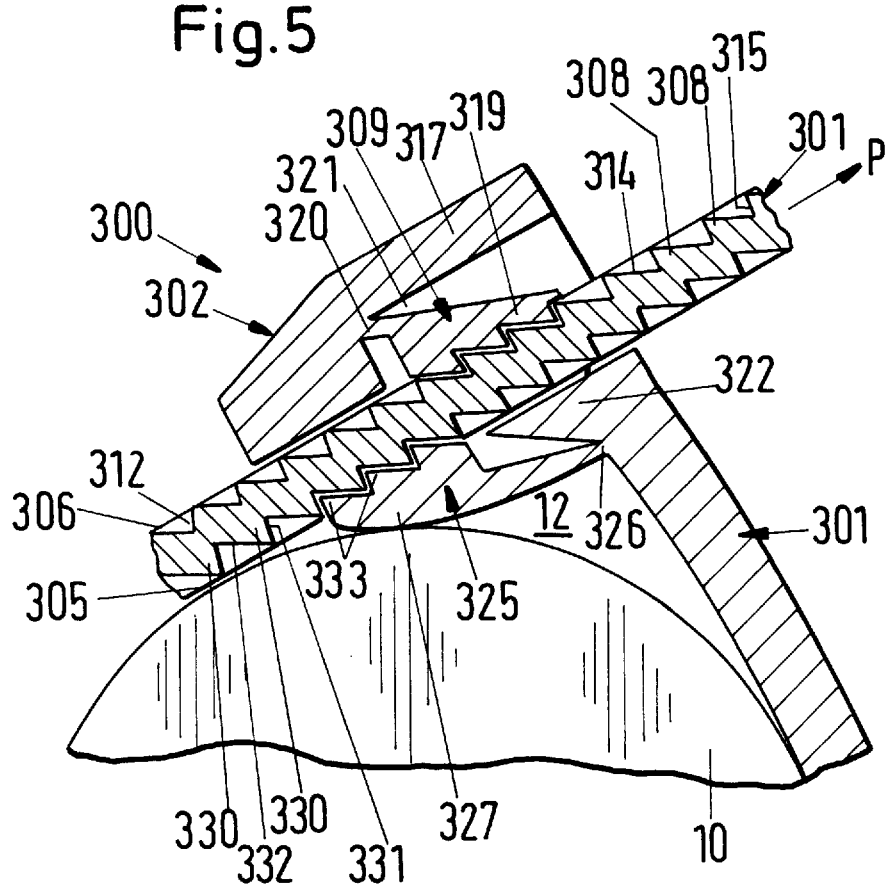
FIG. 5 is a view similar to FIG. 1 showing another representative embodiment of a tensioning strap according to the invention with a blocking element which is not in a blocking condition.

The arresting elements in the tensioning strap 300 shown in FIG. 5 are formed by a series of web-like arresting teeth 308 which arc disposed sequentially in the longitudinal direction and are formed as adjacent grooves, without any space between them, on the outer broad side 306, of the strap part 301 facing the catch 309. The arresting teeth 308, which extend between two continuous longitudinal side borders 312 of the strap part 301, extend transversely with the respect to the longitudinal axis of the strap and each tooth has a shallow flank 314, which is inclined at an angle of 45 degrees with respect to the longitudinal axis, and a steep flank 315, which is essentially perpendicular with respect to the longitudinal axis.

The catch 109, 209 or 309 is adapted in each case to the shape of the arresting elements 108, 208 or 308 and, in the exemplary embodiments illustrated in FIGS. 1–4, is in the form of a nose which tapers toward its free end and projects inwardly, at an acute angle with respect to the pulling direction of the strap part 101 or 201, beyond the outer wall 117 or 217 of the opening 104 or 204 which faces the outer broad side 106 or 206 of the strap part 101 or 201, the width of the nose being smaller than that of the blocking opening 113 or 213. The dimensions of the nose 109 or 209 and of the opening 104 or 204 in the region of the nose 109 or 209 are selected so that, as the strap 101 or 201 is being pulled through the opening 104 or 204, the nose 109 or 209 is deflected elastically in the direction of the outer wall 117 or 217 by the arresting webs 108 or 208 without a great amount of force being required, with the result that the arresting webs 108 or 208 can be moved past the nose 109 or 209. Once the nose 109 or 209 has passed an arresting web 108 or 208, the nose moves back again, as a result of its resilient restoring force, into the rest position, which is illustrated in FIGS. 1–4 and in which it projects into the blocking opening 113 or 213 between two adjacent arresting webs 108 or 208 and blocks a rearward movement of the strap part 101 or 201 in a direction opposite to the pulling direction.

In contrast, the catch 309 in the embodiment shown in FIG. 5 is in the form of a clamping body having three retaining teeth 319 which are complementary to the arresting teeth 308 and have steep and shallow flanks so that the retaining teeth 319 and the arresting teeth 308 can interengage in a positively locking manner. In the engagement condition shown in FIG. 5 the steep flanks and shallow flanks of the arresting teeth 308 mate with corresponding flanks of the retaining teeth 319. The clamping body 309 is integrally formed as a movable portion of an outer wall 317 in a cross-sectional enlargement of the opening 304 which faces the outer broad side 306 of the strap part 301. The connection between the clamping body 309 and the wall 317 is formed by a narrow foot 320 at one end of the enlargements. As in the case of the nose 109 or 209 in the embodiments described above, the clamping body 309 is separated by a gap (not visible) at its opposite narrow sides from the adjacent narrow side walls of the opening 304 which are located opposite the narrow sides of the strap part 301. A wedge-shaped gap 321 is formed in the enlarged part of the opening 304 between the wall 317 and the rear side of the clamping body 309 remote from the strap part 301, with the result that, as in the case of the nose 109 or 209, there is space for resilient deflection. The resilient deformation of the foot 320, which is caused by the deflection of the clamping body 309, as well as the tensile stressing in the strap part 301, result in the clamping body 309 being restored to the blocking condition once the front end of the strap part 301 has been released with the retaining teeth 319 engaging three adjacent arresting teeth 308, of the strap part 301 and being forced into the depressions between them. As a result, the strap part 301 is secured, without any possibility of escaping, between the clamping body 309 and an inner wall 322 of the opening 304 which is located opposite the broad side 305 of the strap part 301.

Each tensioning strap 100, 200 or 300 also has a blocking element 125, 225 or 325 which is integrally formed on the tensioning lock 102, 202 or 302 and moves into blocking engagement with the strap part 101, 201 or 301 to prevent further narrowing of the noose 12 formed by the strap part 101, 201 or 301 through which the corrugated pipes 10 pass when the strap part 101, 201 or 301 surrounds the corrugated pipes 10 in a closely abutting manner.

Figure 2:
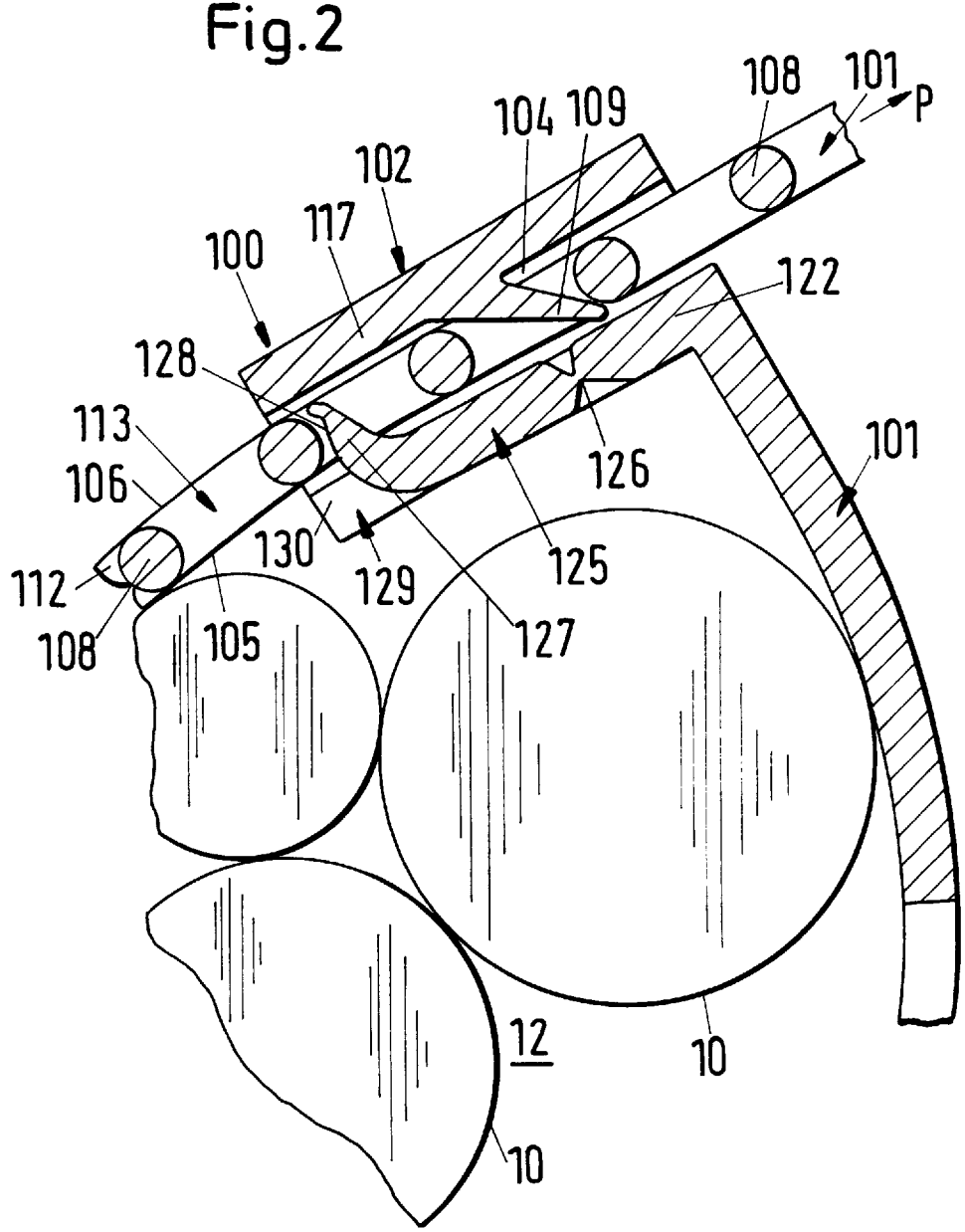
FIG. 2 is a fragmentary longitudinal sectional view similar to FIG. 1, but showing the position of the blocking element when the tensioning strap tightly engages the bundle of pipes all the way around and the blocking element prevents further narrowing of the noose formed by the strap part.

In the particular embodiment illustrated in FIGS. 1 and 2, the blocking element 125 constitutes a blocking lever which is positioned on the inside of the tensioning lock 102, facing the corrugated pipes 10, in a recess 129 extending in the longitudinal direction of the tensioning lock 102 and located in the inner wall 122. The tensioning lock 102 is integrally connected to the wall 122 by a film hinge 126 at the end of the lock which faces in the pulling direction of the strap part 101. The width of the blocking lever 125 is somewhat smaller than the distance between the parallel longitudinal side portions 112 of the strap part 101 so that an engagement part 127, which is provided at the free end of the blocking lever remote from the film hinge 126 can be pivoted into the blocking openings 113 between the arresting webs 108 of the strap part 101 as shown in FIG. 2. The engagement part 126 of the blocking lever is bent outwardly in the direction toward the strap part 101 and, on the side of the engagement part 121 which faces opposite to the pulling direction of the strap part 101, a concave curved section 128 is provided. In the engagement condition, the convex surface of an arresting web 108 of the strap part 101 facing the pulling direction engages the concave curved section 128 and prevents further movement of the strap part 101 in the pulling direction.

The blocking lever 125 is formed integrally with the tensioning lock 102 so that, if no external force is exerted on it, it is deflected out of the recess 129 of the tensioning lock 102 in the inward direction, i.e. in the direction toward the corrugated pipes or of the noose in the tensioning strap 101 extending away from the tensioning lock 102 as shown in FIG. 1, the distance between the engagement part 127 and the strap part 101 being large enough to prevent an unintentional blocking engagement. Motion of the strap part 101 in the tensioning lock 102 in the direction toward the blocking lever 125, which could likewise result in an unintentional blocking engagement, is prevented by two opposed side parts 130 of the inner wall 127 of the opening 104 which are spaced apart opposite each other in the region of the recess 129 and support the longitudinal side members 112 of the strap part 101 on the side which faces the corrugated pipes 10.

In order to form a number of corrugated pipes 10 or the like into a bundle, the tensioning strap 100 is preferably positioned around the corrugated pipes 10 with the tensioning lock 102 at the top, as shown in FIGS. 1 and 2, with the result that the pipes do not press against the blocking lever 125. The free end of the strap part 101 is pushed through the opening 104 of the tensioning lock 102 and a pulling force is then applied in the direction of the arrow P, thus reducing the cross section of the noose 12 which is formed by the strap part 101. This causes the strap part 101, 201 or 301 to press against the corrugated pipes 10 from the outside and displace them within the noose 12 to some extent until, once the strap part 101 engages the corrugated pipes 10 all the way around, the corrugated pipe 10 adjacent to the tensioning lock 102 presses against the blocking lever 125 and pivots the latter outwardly around the film hinge 125 which acts as pivot point so that the engagement part 127 of the blocking lever 125 moves toward the strap part 101 while being guided in the tensioning lock 102 and, ultimately, projects between two arresting webs of the strap part 101 as shown in FIG. 2, thus blocking any further movement of the strap part 101 in the pulling direction.

Figure 3:
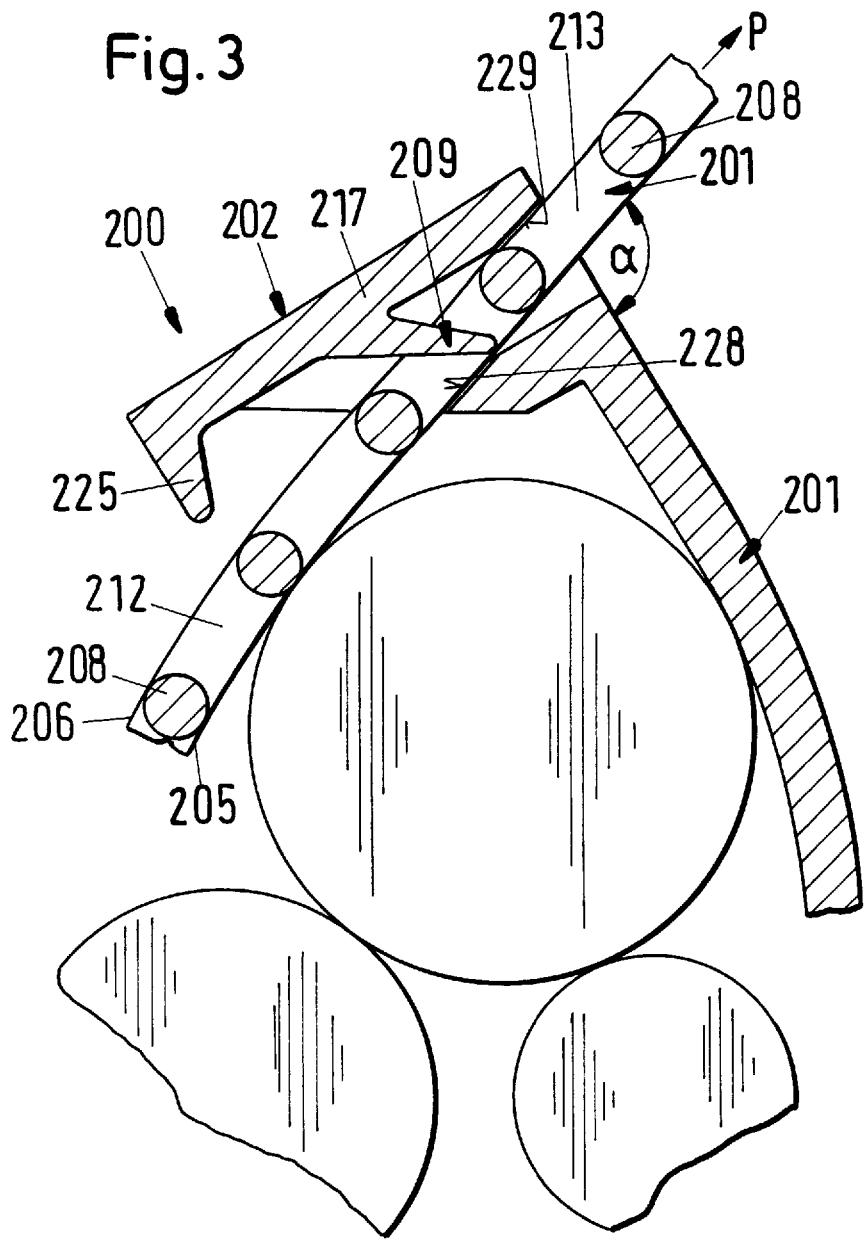
FIG. 3 is a view similar to FIG. 1 illustrating another representative embodiment of a tensioning strap according to the invention and showing a blocking element which is not in a blocking position.
Figure 4:
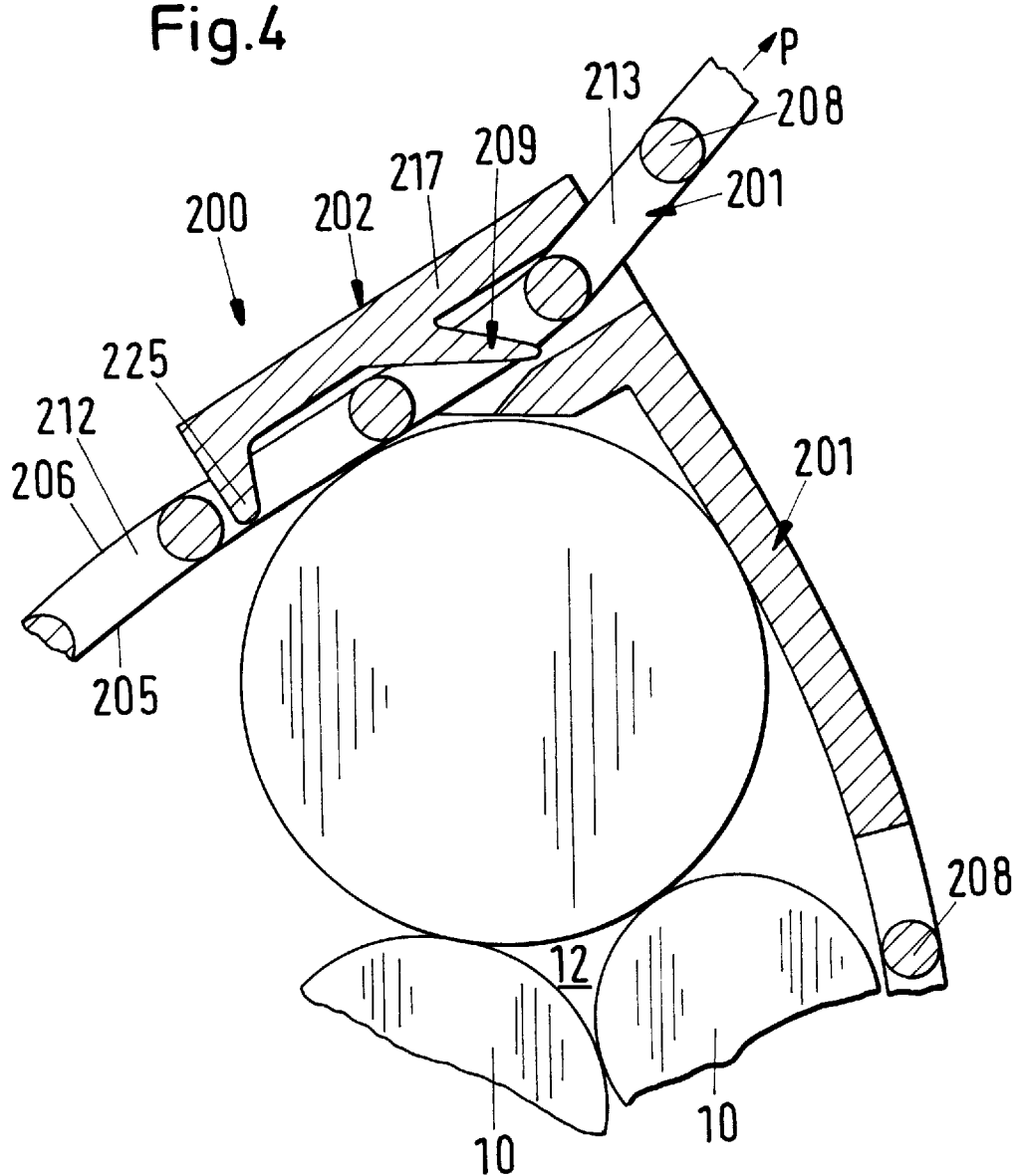
FIG. 4 is a further view of the embodiment of FIG. 3 with the blocking element in the blocking position.

On the other hand, the blocking element in the specific embodiment illustrated in FIGS. 3 and 4 is provided by a blocking nose 225 which is integrally formed at the end of the tensioning lock on an outer part of the tensioning lock 202 opposite to the pulling direction and projects inwardly in the direction of the strap part 201. The width of the projecting blocking nose 225 is selected so that it is smaller than the width of the blocking openings 213 which are formed by the arresting webs 208 and the longitudinal side borders 212 of the strap part 201. As a result, the blocking nose projects into one of the blocking openings 213 when the strap part 201 is forced outwardly, from the position illustrated in FIG. 3, in the direction of the blocking nose 225 by a corrugated pipe 10 adjacent to the tensioning lock 202 and is brought into blocking engagement with the blocking nose as shown in FIG. 4.

In this particular embodiment, premature engagement between the blocking nose 225 and the strap part 201 is prevented by providing two sloping guide surfaces 228 and 229 within the opening 204 of the tensioning lock 202 so that the guide surfaces face the broad sides 205 and 206, respectively, of the strap part 201. The two parallel guide surfaces 228 and 229 extend at an acute angle with respect to a longitudinal axis of the tensioning lock 202, or of the opening 204 therein, on an outer wall 217 and an inner wall 222, respectively, of the opening 204. The guide surface 229 on the outer wall 217 is arranged at the outlet end of the opening 204, while the guide surface 228 on the inner wall 222 is arranged at the inlet end of the opening 204. The guide surfaces 228 and 229 have the effect of maintaining a distance between the strap part 201 and the blocking nose 225 when the pulling direction extends at an obtuse angle cc with respect to that section of the tensioning strap 201 which is connected to the tensioning lock 202. The corrugated pipe 10 adjacent to the tensioning lock 202 forces the strap part 201 in the region of the tensioning lock 202 in the direction of the blocking nose 225 and brings it into blocking engagement with the latter as shown in FIG. 4 only when the strap part 201 tightly engages the corrugated pipes 10 on all sides, thus preventing further movement of the strap part 201 in the pulling direction.

In the embodiment illustrated in FIG. 5, the blocking element 325 comprises, similarly to the embodiment of FIGS. 1 and 2, a blocking lever which is located on the inside of the tensioning lock 302 and is pivotably connected to the tensioning lock 302 by a film hinge 326. In contrast to the embodiments of FIGS. 1–4, in the engagement condition shown in FIG. 5, an engagement part 327 of the blocking lever 325, is in blocking engagement with latching teeth 330 which are provided in a recessed manner on the broad side 305 of the strap part 301, situated opposite the arresting teeth 308. The latch teeth 330 extend between the two longitudinal side members 312 of the strap part and have a steep flank 331 and a shallow flank 332 in the same way as the arresting teeth 308. In contrast to the arresting teeth 308, however, the steep flank 331 of the latching teeth 330 faces toward the pulling direction of the strap part 301.

The engagement part 327, which is located at the free end of the blocking element 325, opposite the film hinge 326, has an arrangement similar to that of the clamping body 309, i.e. it is provided with three retaining teeth 333 which are complementary to the latching teeth 330 and which, in the engagement state, fit together with three latching teeth 330 in a positively locking manner, the steep flanks 331 and the shallow flanks 332 being located opposite one another in pairs but in this case they prevent movement of the strap part 301 in the pulling direction.

Figure 6:
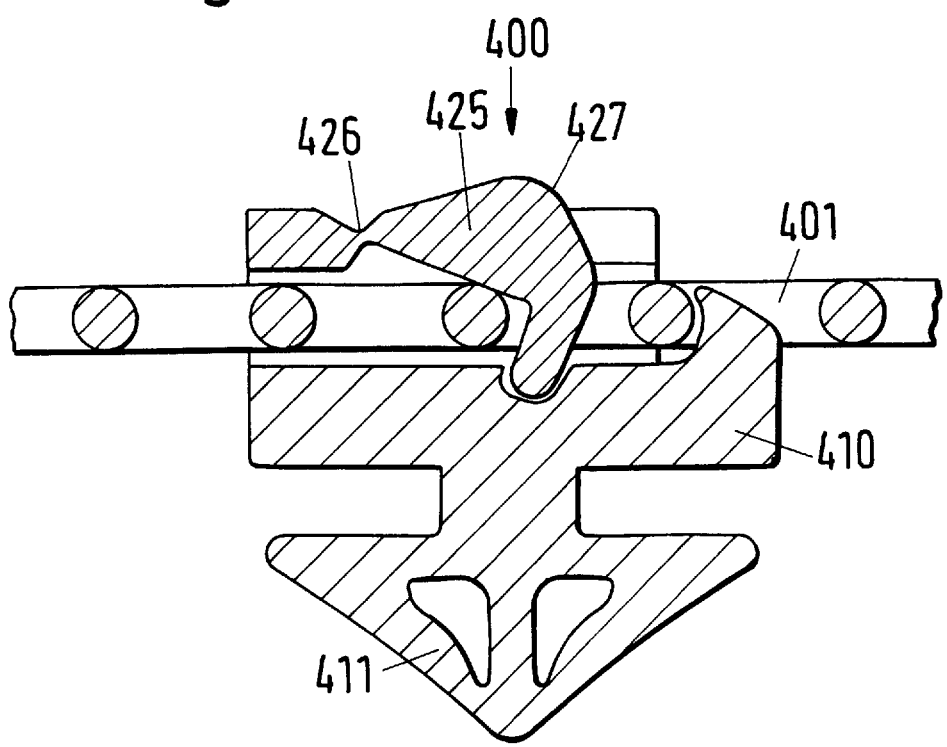
FIG. 6 is a fragmentary section view showing a further embodiment of a tensioning strap according to the invention having a movable foot part.

The further embodiment in of a tensioning-strap configuration 400, illustrated in fragmentary form in FIG. 6, includes a strap part 401 and, unlike the variants described above, has a separate foot part 410 in which the tensioning lock 402 is provided. The foot part 410 has a fastening element 411, which may be in the form of a clip, as shown in FIG. 6, or a clamp, a stay bolt, a threaded bore, a screw-bolt or the like, in order to permit mounting of the foot part on, for example, a receiving body such as a body of a vehicle or an individual component or assembly thereof. A blocking element 425 is supported by, and can be pivoted about, a film hinge 426 when it is subjected to forces applied to an abutment spine 427 and directed toward the inside of the lock by an object (not illustrated) such a pipe 10 during tightening of the tensioning strap 400.

Although the invention has been described herein with reference to specific embodiments, many modifications and variations therein will readily occur to those skilled in the art. Accordingly, all such variations and modifications are included within the intended scope of the invention.

I claim:

1. A tensioning strap for securing at least one elongate object, comprising:

an elongate flexible strap part which is wound around in a noose and for engaging the at least one object and has a series of longitudinally spaced arresting elements;

a tensioning lock for receiving and arresting the strap part;

a catch in the tensioning lock for engaging at least one of the arresting elements of the strap part to prevent enlargement of the noose which is formed by the strap part and surrounds the object; and a blocking element which moves into blocking engagement with the strap part and prevents further closing of the noose formed by the strap part when the strap part surrounds and engages the at least one object in a closely abutting manner, the blocking element being moved into blocking engagement as a result of a force exerted on the strap part or the blocking element by the at least one object.

2. A tensioning strap according to claim 1 wherein the tensioning lock is provided at at least one end of the strap part.

3. A tensioning strap according to claim 1 wherein the tensioning lock has at least one foot part for fastening the tensioning lock on a receiving body.

4. A tensioning strap according to claim 3 wherein the foot part is an integrally formed component of the tensioning lock.

5. A tensioning strap according to claim 3, wherein the foot part can be moved with respect to the strap part.

6. A tensioning strap according to claim 1 wherein the blocking element is provided in the region of the tensioning lock.

7. A tensioning strap according to claim 4 wherein the blocking element is provided in the foot part.

8. A tensioning strap according to claim 1 wherein the blocking element is movable into engagement with at least one of the arresting elements of the strap part.

9. A tensioning strap according to claim 8 wherein the blocking element is movable into engagement with a side of the arresting element which engages the catch.

10. A tensioning strap according to claim 1 wherein the arresting elements are formed by longitudinally spaced webs which extend transversely with respect to a longitudinal direction of the strap part.

11. A tensioning strap according to claim 10 wherein the webs extend between two continuous longitudinal side members of the strap part and form blocking openings for receiving the catch and the blocking element.

12. A tensioning strap according to claim 1 wherein the strap part has a plurality of latching elements for blocking engagement with the blocking element.

13. A tensioning strap according to claim 12 wherein the arresting elements and latching elements are located on opposite longitudinal sides of the strap part.

14. A tensioning strap according to claim 12 wherein the arresting elements and latching elements are formed as teeth each having a steeper flank and a shallower flank.

15. A tensioning strap according to claim 14 wherein the steeper flanks of the arresting teeth and of the latching teeth are oriented essentially in opposite directions.

16. A tensioning strap according to claim 1 wherein the blocking element is located inside of the tensioning lock facing the at least one object and is forced outwardly into engagement with the strap part by the at least one object.

17. A tensioning strap according to claim 16 wherein the blocking element is positioned inwardly beyond the inside of the tensioning lock when no external force is applied to the blocking element.

18. A tensioning strap according to claim 16 wherein the blocking element is pivotably connected to the tensioning lock at a pivot point and includes an engagement part which is located at a distance from the pivot point and which is movable between at least two adjacent arresting or latching elements of the strap part.

19. A tensioning strap according to claim 18 wherein the blocking element is connected to the tensioning lock by a film hinge.

20. A tensioning strap according to claim 1 wherein the blocking element is located outside the noose which is formed by the strap part and wherein the strap part is forced outwardly into blocking engagement with the blocking element by the at least one object within the noose.

21. A tensioning strap according to claim 20 wherein the blocking element is connected rigidly to the tensioning lock.

22. A tensioning strap according to claim 20 wherein the blocking element is a blocking nose which projects inwardly beyond part of the tensioning lock in the direction of the strap part.

23. A tensioning strap according to claim 20 wherein the tensioning lock has at least one guide for the strap part which maintains a distance between the blocking element and the strap part.

24. A tensioning strap according to claim 1 wherein the tensioning strap is a single piece and consists of a plastic material.

25. A tensioning strap according to claim 1 wherein the tensioning lock has an opening to receive the strap part.

26. A tensioning strap according to claim 25 wherein the catch is integrally formed in the opening of the tensioning lock.

27. A tensioning strap according to claim 25 wherein, as the strap part is moved through the opening, it first passes the blocking element and then passes the catch.

28. A tensioning strap according to claim 25 wherein, as the strap part is moved through the opening, the catch is deformed elastically by the arresting elements.

29. A tensioning strap according to claim 1 wherein the arresting elements in the strap are arranged in the form of a ladder.

30. A tensioning strap according to claim 1 wherein the arresting elements of the strap part have a sawtooth-like form.

* * * * *